(12) United States Patent
Laitila et al.

(10) Patent No.: US 9,807,012 B2
(45) Date of Patent: Oct. 31, 2017

(54) TRAFFIC FLOW MOBILITY WITH SINGLE HOST CONNECTION

(75) Inventors: Matti Einari Laitila, Oula (FI); Seppo Ilmari Vesterinen, Oulunsalo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 311 days.

(21) Appl. No.: 14/423,183

(22) PCT Filed: Aug. 23, 2012

(86) PCT No.: PCT/EP2012/066414
§ 371 (c)(1),
(2), (4) Date: Mar. 24, 2015

(87) PCT Pub. No.: WO2014/029437
PCT Pub. Date: Feb. 27, 2014

(65) Prior Publication Data
US 2015/0236956 A1 Aug. 20, 2015

(51) Int. Cl.
*H04L 12/26* (2006.01)
*H04W 4/00* (2009.01)
*H04L 12/801* (2013.01)
*H04L 12/721* (2013.01)
*H04W 36/22* (2009.01)

(52) U.S. Cl.
CPC ............... *H04L 47/12* (2013.01); *H04L 45/70* (2013.01); *H04W 36/22* (2013.01)

(58) Field of Classification Search
CPC ......... H04L 47/12; H04L 45/70; H04W 36/22
See application file for complete search history.

(56) References Cited

U.S. PATENT DOCUMENTS

| 8,599,790 B1* | 12/2013 | Damle | H04W 76/022 370/331 |
| 2010/0309899 A1* | 12/2010 | Aso | H04L 47/36 370/338 |

FOREIGN PATENT DOCUMENTS

| EP | 1 432 198 A1 | 6/2004 |
| EP | 2 242 293 A1 | 10/2010 |
| WO | WO 2007/007856 A1 | 1/2007 |

OTHER PUBLICATIONS

International Search Report dated Jun. 7, 2013 corresponding to International Patent Application No. PCT/EP2012/066414.
(Continued)

*Primary Examiner* — Kiet Tang
(74) *Attorney, Agent, or Firm* — Squire Patton Boggs (US) LLP

(57) ABSTRACT

There are provided measures for traffic flow mobility with a single host connection. Such measures exemplarily comprise the definition of a first binding between a set of home addresses of a host and an address of a first interface of a mobile access gateway to a local mobility anchor, the definition of at least one second binding between the same set of home addresses of the host and an address of at least one second interface of the mobile access gateway to the local mobility anchor, and the recording of a mapping between any one of the first and second bindings and traffic flows between the host and the local mobility anchor via a host connection to the mobile access gateway.

35 Claims, 8 Drawing Sheets

(56) References Cited

OTHER PUBLICATIONS

Tansir Ahmed et al., "Multi Access Data Network Connectivity and IP Flow Mobility in Evolved Packet System (EPS)," Wireless Communications and Networking Conference (WCNC), 2010 IEEE, Apr. 18, 2010, pp. 1-6, XP031706546.

Antonio de la Oliva et al., "IP Flow Mobility: Smart Traffic Offload for Future Wireless Networks," IEEE Communications Magazine, IEEE Service Center, vol. 49, No. 10, Oct. 31, 2011, pp. 124-132, XP011385325.

CJ. Bernardos, "Proxy Mobile IPv6 Extensions to Support Flow Mobility draft-ietf-netext-pmipv6-flowmob-03," NETEXT Working Group, Internet Draft, UC3M, Mar. 12, 2012, pp. 1-21.

\* cited by examiner

TRAFFIC FLOW MOBILITY WITH SINGLE HOST CONNECTION

FIELD

The present invention relates to traffic flow mobility with a single host connection. More specifically, the present invention exemplarily relates to measures (including methods, apparatuses and computer program products) for realizing traffic flow mobility with a single host connection.

BACKGROUND

In modern and future communication systems, including both mobile and fixed networks, which are typically IP based, there are trends of traffic offloading and flow mobility. Operators are interested in offloading IP traffic from one access type or technology (such as a cellular network) to another access type or technology (such as a local network, e.g. an enterprise network), but typically still in such a way that IP traffic is carried via the operator core network. To this end, IP traffic flows are subject to mobility in terms of a switching of traffic routes due to offloading in the range between the host (e.g. UE or MN) and the operator core network, especially the operator gateway. A main motivation for traffic offload and flow mobility is the vast increase of data traffic in the past years that has pushed operator networks, especially cellular or MNO network, to their limits in terms of data/radio throughput and performance.

Both 3GPP and IETF have defined their own specifications for traffic offloading and flow mobility in the context of traffic offloading. The current specifications are however based on a concept of switching IP traffic flows between individual interfaces or (access) connections of the host, meaning that also the access type or technology is switched.

As an example, there is an IETF draft for Proxy Mobile IPv6 Extensions to Support Flow Mobility. This proposal however assumes that the IP host has two different interfaces connected to at least two separate networks each hosting its own MAG functions. Traffic flows are switched between access connections of the host, i.e. between different host interfaces or (access) connections corresponding to different MAG functions.

As another example, 3GPP and IFOM specifications introduce approaches for flow mobility, which are built on the basis of DSMIPv6 and PMIPv6. MAPIM and IFOM also assume two different interfaces, i.e. two different access types or technologies, to two separate networks each hosting MAG functions of their own, and the traffic flow switching is done between the interfaces or (access) connections of the host, thus corresponding to different MAG functions.

As still another example, SIPTO is a 3GPP feature in which part of the traffic is offloaded from the MNO's transport network to another PDN below the P-GW which is located in the MNO's core network. SIPTO is based on multiple PDN connections, wherein a new PDN connection is established to the properly located offloading GW (such as GGSN or P-GW). However, traffic flow mobility is not possible with SIPTO, since an IP attachment point of the new PDN connection is different as compared with the initial PDN connection. Moreover, the establishment of a new PDN connection requires lots of signaling and, since logically from the host's perspective the SIPTO connection is separate, an IP interface with an own set of IP addresses. Thus, traffic offloading with SIPTO is subject to significant signaling efforts and is not transparent to the host.

While such concepts are reasonable with legacy systems, i.e. legacy radio types and technologies, with limited data/radio throughput and performance, they are not effective for modern and future communication systems.

With the introduction of LTE and especially LTE-A and beyond 4G radios (with radio throughput of 10 Gbit/s), there arises a new situation in that the radio part is not anymore such a bottleneck of the overall data path. As building the transport network to meet the increased radio capacity of the radio part is expensive, thus the possibility to offload traffic out of the transport network while remaining within a single access type or technology, i.e. the same host interface or (access) connection, is desired.

Accordingly, it is desirable to enable traffic flow mobility with a single host connection.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising establishing a first binding between a set of home addresses of a host and an address of a first interface of a mobile access gateway to a local mobility anchor, establishing at least one second binding between the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway.

According to an exemplary aspect of the present invention, there is provided a method comprising specifying a first binding by associating a set of home addresses of a host and an address of a first interface of a mobile access gateway to a local mobility anchor, specifying at least one second binding by associating the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway.

According to an exemplary aspect of the present invention, there is provided an apparatus comprising a connector configured to connect to at least another apparatus, a memory configured to store computer program code, and a processor configured to cause the apparatus to perform: establishing a first binding between a set of home addresses of a host and an address of a first interface of a mobile access gateway to a local mobility anchor, establishing at least one second binding between the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway.

According to an exemplary aspect of the present invention, there is provided an apparatus comprising a connector configured to connect to at least another apparatus, a memory configured to store computer program code, and a processor configured to cause the apparatus to perform: specifying a first binding by associating a set of home addresses of a host and an address of a first interface of a mobile access gateway to a local mobility anchor, specifying at least one second binding by associating the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

The computer program product may comprise or may be embodied as a (tangible) computer-readable (storage) medium or the like on which the computer-executable computer program code is stored, and/or the program is directly loadable into an internal memory of the computer or a processor thereof.

Advantageous further developments or modifications of the aforementioned exemplary aspects of the present invention are set out in the following.

By way of exemplary embodiments of the present invention, there is enabled traffic flow mobility with a single host connection.

Any one of the above aspects enables dynamically offloading, within one access type or technology or within one host interface or (access) connection, part or all of traffic such as IP traffic flows from an initial transport route to an alternative route in a network-controlled manner. As the offload granularity is on the traffic flow (IP flow) level, the traffic offloading can be controlled per traffic type, i.e. what kind of traffic is to be switched to an alternative route. As the host needs only a single interface or (access) connection, the flow mobility in the context of traffic offloading is transparent to the host.

Thus, improvement is achieved by methods, apparatuses and computer program products enabling/realizing traffic flow mobility with a single host connection.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to IETF specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any fixed or mobile communication system and/or network deployment in which traffic offloading and/or traffic flow mobility is (to be) realized.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) traffic flow mobility with a single host connection.

Figure 1:
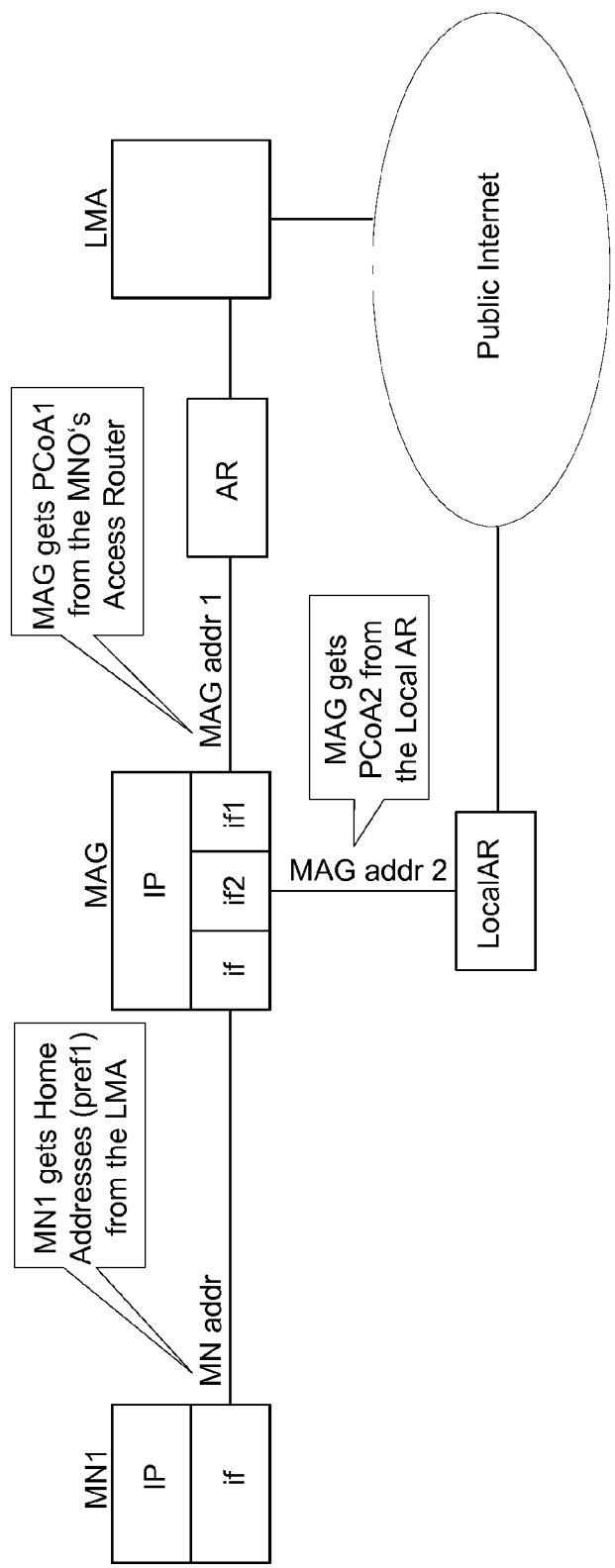
FIG. 1 shows a schematic block diagram of a system configuration according to exemplary embodiments of the present invention.

FIG. 1 shows a schematic block diagram of a system configuration according to exemplary embodiments of the present invention.

As is shown in FIG. 1, a mobile node MN1 representing a host or IP host is connected to a mobile access gateway MAG via a single host connection between an interface if of the MN1 and an interface if of the MAG. The mobile access gateway MAG is connected to a local mobility anchor LMA via two connections, wherein the first connection is between a first interface if1 of the MAG and the LMA exemplarily via an access router AR which could for example reside in a transport network (not shown) of an operator such as a fixed network operator or a mobile network operator MNO of the host MN1, and wherein the second connection is between a second interface if2 of the MAG and the LMA exemplarily via a local access router AR which could for example reside in a local network (not shown) such as an enterprise network and the public Internet. Stated in other words, the entity (e.g. the network element) containing the MAG function is connected to two different networks via two different interfaces.

It is to be noted that, while presence of a single second interface if2 at the MAG is exemplarily illustrated for the sake of simplicity, the MAG could comprise more than one second interface if2, and may thus be connected to more than two different networks via a respective number of different interfaces. Accordingly, a plurality of second MAG interfaces if2 may be connected with a plurality of networks each having a route the LMA, respectively. Also, the route to the LMA via the second interface does not have to pass the public Internet or the like, as exemplified in FIG. 1.

According to exemplary embodiments of the present invention, the MAG (function) could be located in any entity or network element located at a feasible place for flow mobility, such as e.g. in a user equipment UE, any terminal such as a mobile node MN, a desktop or handheld computer or the like, a wireless or wired access point, a base station, or the like, and/or the LMA (function) could be located in an operator (e.g. MNO) gateway, or the like. The MAG (function) and/or the LMA (function) could be operable in accordance with a proxy mobile IP protocol such as e.g. PMIPv6. Accordingly, the MAG (function) and the LMA (function) could represent a proxy mobile IP domain such as e.g. a PMIPv6 domain.

When the MAG (function) is located at the terminal side, e.g. in a user equipment UE, any terminal such as a mobile node MN, a desktop or handheld computer or the like, the flow switching/mobility described below is applicable for switching flows e.g. between different radios or radio paths/interfaces. When the MAG (function) is located at the network side, e.g. in base station or the like, the flow switching/mobility described below is applicable for switching flows e.g. between different (typically wired) transport/connectivity links or transport/connectivity paths/interfaces.

In such system configuration, the host MN1 is able to get his (IP) home addresses or (IP) home (network) prefixes from the LMA, wherein pref1 is to denote a specific set of home addresses such as those with a common prefix or set of prefixes. Further, the MAG is able to get a first MAG (IP) address as an address of its first interface if1 from the access router on the first connection to the LMA, i.e. at the first interface if1, wherein this (IP) address may be a (IP) care of address referred to as PCoA1. Still further, the MAG is able to get a second MAG (IP) address as an address of its second interface if2 from the local access router on the second connection to the LMA, i.e. at the second interface if2, wherein this (IP) address may be a (IP) care of address referred to as PCoA2.

According to exemplary embodiments of the present invention, traffic flows such as IP flows between the host MN1 and the LMA can be routed over the single host connection between MN1 and MAG and any one of the two connections between MAG and LMA. That is to say, while the host MN1 has a single interface or (access) connection to the MAG, i.e. a network access via a single entity, there exist two interfaces or connections (i.e. routes) between the MAG and the LMA between which the routing of traffic flows such as IP flows can be switched. In the following, it is exemplarily assumed that the first interface or connection relates to an initial network connection or route (dedicated for initial traffic routing), while the second interface or connection relates to another (alternative/Additional) network connection or route (dedicated for traffic offloading).

In view of the above, exemplary embodiments of the present invention could involve basic properties as follows.

The entity or network element containing the MAG (function) is connected to at least two different networks each of which has a route to the LMA (function).

Traffic flows could be switched dynamically from one transport route to another "on the fly", i.e. in a dynamic or real-time manner, with minimal signaling.

The host needs only one interface or (access) connection to the MAG (function) or the network where the MAG (function) is located, wherein the (access) connection could be based on wireless access types or technologies (3GPP, WLAN, . . . ) or wired access types or technologies.

The traffic flow switching explained above is transparent to the host. That is, neither the (IP) address nor the interface or (access) connection is (to be) changed.

Figure 2:
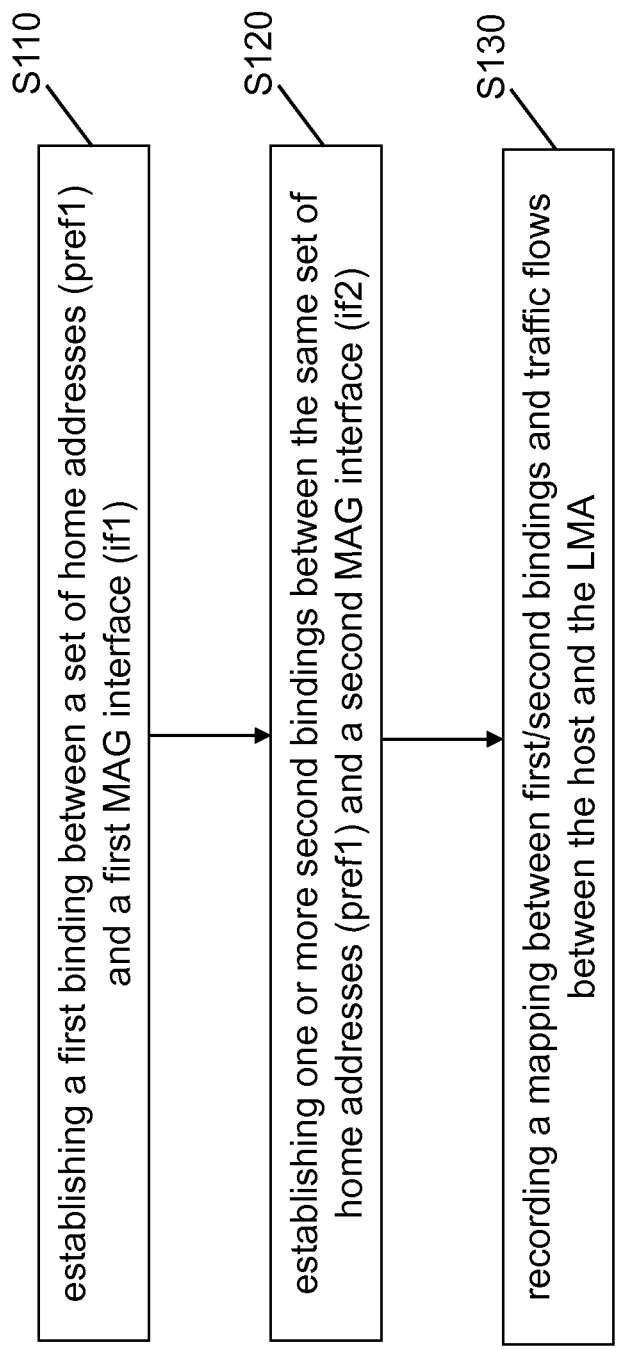
FIG. 2 shows a flowchart of a procedure operable at a local mobility anchor according to exemplary embodiments of the present invention.

FIG. 2 shows a flowchart of a procedure operable at a local mobility anchor according to exemplary embodiments of the present invention.

As shown in FIG. 2, a procedure according to exemplary embodiments of the present invention, which is operable e.g. at the LMA according to the system configuration of FIG. 1, comprises an operation (S110) of specifying a first binding by associating a set of home addresses pref1 of a host MN1 and an address of a first interface if1 of a mobile access gateway MAG to the local mobility anchor LMA, an operation (S120) of specifying at least one second binding by associating the same set of home addresses pref1 of the host MN1 and an address of at least one second interface if2 of the mobile access gateway MAG to the local mobility anchor LMA, and an operation (S130) of recording a mapping between any one of the first and second bindings and traffic flows between the host MN1 and the local mobility anchor LMA via a host connection to the mobile access gateway MAG.

Figure 3:
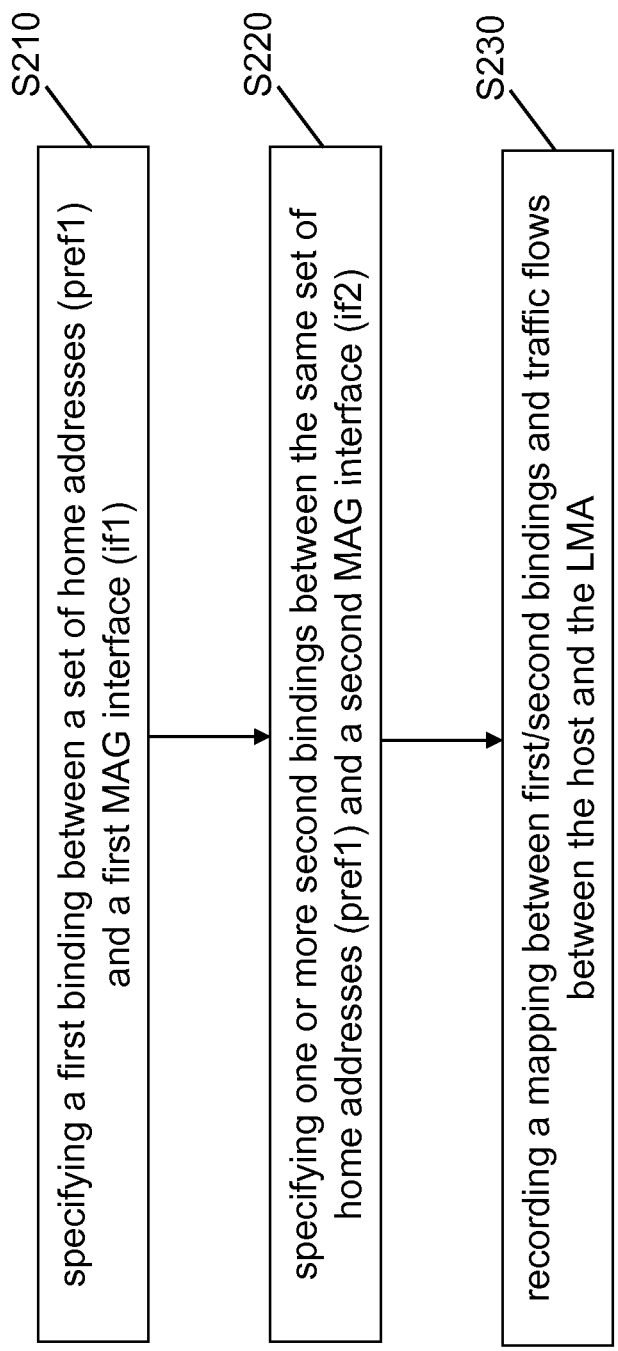
FIG. 3 shows a flowchart of a procedure operable at a mobile access gateway according to exemplary embodiments of the present invention.

FIG. 3 shows a flowchart of a procedure operable at a mobile access gateway according to exemplary embodiments of the present invention.

As shown in FIG. 3, a procedure according to exemplary embodiments of the present invention, which is operable e.g. at the MAG according to the system configuration of FIG. 1, comprises an operation (S210) of establishing a first binding between a set of home addresses pref1 of a host MN1 and an address of a first interface if1 of the mobile access gateway MAG to a local mobility anchor LMA, an operation (S220) of establishing at least one second binding by associating the same set of home addresses pref1 of the host MN1 and an address of at least one second interface if2 of the mobile access gateway MAG to the local mobility anchor LMA, and an operation (S230) of recording a mapping between any one of the first and second bindings and traffic flows between the host MN1 and the local mobility anchor LMA via a host connection to the mobile access gateway MAG.

By virtue of the exemplary procedures according to FIGS. 2 and 3, corresponding first and second bindings are defined both at a mobile access gateway and a local mobility anchor, and corresponding mappings are recoded both at the mobile access gateway and the local mobility anchor. As exemplified below, such bindings and mappings may be stored and managed in the form of corresponding tables/caches, respectively. However, they may equally be stored and managed in the form of lists or in any other form.

Figure 4:
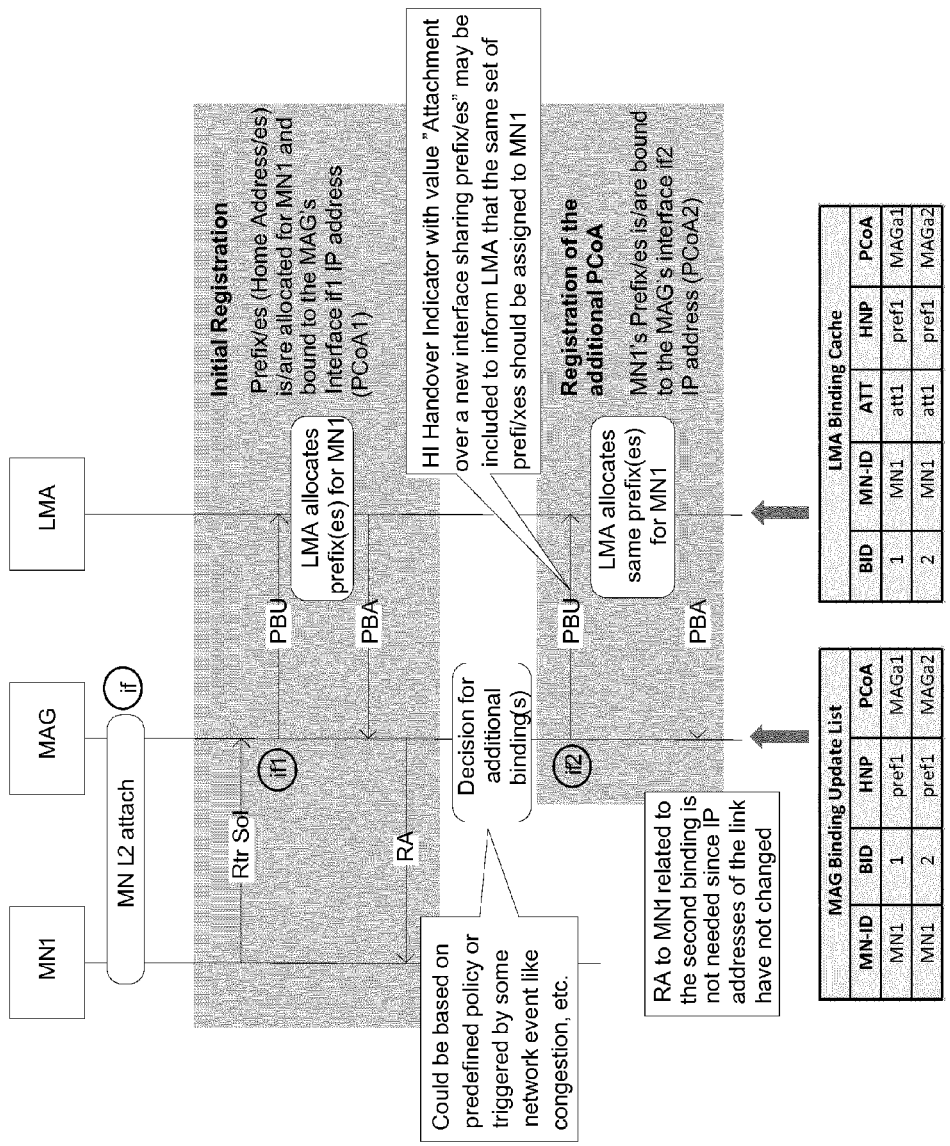
FIG. 4 shows a signaling diagram of a procedure according to exemplary embodiments of the present invention.

FIG. 4 shows a signaling diagram of a procedure according to exemplary embodiments of the present invention.

As shown in FIG. 4, a signaling flow representing an exemplary procedure according to exemplary embodiments of the present invention basically comprises, after an attach process of the host MN1, an initial registration process and an additional registration process of the host MN1 to the domain constituted by the LMA and the MAG, e.g. to the PMIP domain (via the MAG). The underlying system configuration of such exemplary procedure may be that of FIG. 1, or may be a similar or equivalent thereto.

In the attach process, the host MN1 performs a Layer 2 (L2) attachment to an access network, thereby establishing a host or access connection to the MAG, i.e. its interface if as shown in FIG. 1.

In the initial registration process, the host MN1 is registered with respect to the first interface if1 of the MAG. Therein, the first binding between a set of home addresses pref1 of the host MN1 and an address of the first interface if1 of the MAG, e.g. a proxy care of address PCoA1 thereof, is defined. Thereby, an initial route for traffic flows between the host MN1 and the LMA is registered.

In the initial registration process, the LMA allocates e.g. IPv6 prefix(es) (home prefix/es) for the MN1, wherein the home (network) prefix/es is/are bound to e.g. the IP address (PCoA1) of the first interface if1 of the MAG.

As shown in FIG. 4, the initial registration process may be initiated by an initial registration message such as a Router Solicitation message from the MN1 to the MAG. Upon receipt thereof, the MAG may then request a binding update for the first binding from the LMA via its first interface if1, e.g. by means of a PBU message. Upon receipt of such request, the LMA may specify the first binding by a corresponding allocation, and may then report on the thus established first binding to the MAG, e.g. by means of a PBA message. The LMA may thus establish the first binding, and may respond to the initial registration message to the MN1, e.g. by means of a Router Advertisement message including an information on the thus registered initial route to the LMA via the first interface if1 of the MAG.

Accordingly, in the initial registration process, the first binding is specified at the LMA by way of allocation, and is established at the MAG.

In the additional registration process, the host MN1 is registered with respect to the second interface if2 of the MAG. Therein, the second binding between the set of home addresses pref1 of the host MN1 and an address of the second interface if2 of the MAG, e.g. a proxy care of address PCoA2 thereof, is defined. Thereby, an additional or alternative route for traffic flows between the host MN1 and the LMA is registered.

In the additional registration process, the LMA allocates e.g. IPv6 prefix(es) (home prefix/es) for the MN1, wherein the home (network) prefix/es is/are bound to e.g. the IP address (PCoA2) of the second interface if2 of the MAG.

As shown in FIG. 4, the additional registration process may be initiated by a decision of/at the MAG and a corresponding trigger from the MAG to the LMA. That is, the MAG may make a decision (of the need or appropriateness) for an additional registration, and may initiate the additional registration process on the basis of the decision. The decision making at the MAG may be based on a network-related condition or event, such as a congestion (e.g. of the previously registered initial route), and/or a predefined policy.

The triggering for the additional registration process from the MAG to the LMA may be effected by requesting a binding update for the second binding from the LMA via its second interface if2, e.g. by means of a PBU message. In the context of such triggering, the LMA needs to know that the same set of prefixes should be allocated for the host MN1, i.e. that an additional registration rather than an initial registration is to be performed for the second interface if2 of the MAG. This knowledge at the LMA can be achieved by way of a corresponding indication from the MAG to the LMA, such as an indicator indicating a request for sharing the same set of home addresses of the host with the first interface in a binding update request, as exemplified by way of the HI value in the PBU message in FIG. 4. This knowledge at the LMA can also be achieved by way of at least one predefined (static) policy at the LMA, which may be responsive to receipt of a corresponding binding update request. Namely, a binding update request for the at least one second binding from the MAG may cause at least one predefined policy at the LMA to determine a sharing of the same set of home addresses of the host with the first interface.

Upon receipt of such trigger/request, the LMA may specify the second binding by a corresponding allocation, and may then report on the thus established second binding to the MAG, e.g. by means of a PBA message. The LMA may thus establish the second binding.

Accordingly, in the additional registration process, the second binding is specified at the LMA by way of allocation, and is established at the MAG.

As a result of the above exemplary procedure, there may be set up a MAG binding update list at the MAG and a LMA binding cache at the LMA, as exemplified at the bottom of FIG. 4. As is evident, the host MN1 has, for the same home (network) prefix or set of home (network) prefixes (denoted by pref1), two bindings identified by a binding identifier BID corresponding to the different interfaces of the MAG or, stated in other words, the different routes between the MAG and the LMA.

Accordingly, according to exemplary embodiments of the present invention, the MAG (function/entity) has (knowledge of) a mapping, where one set of an IP host's home (network) prefixes is associated with two or more interface addresses such as PCoA'es. Such mapping is equally available at the LMA.

Figure 5:
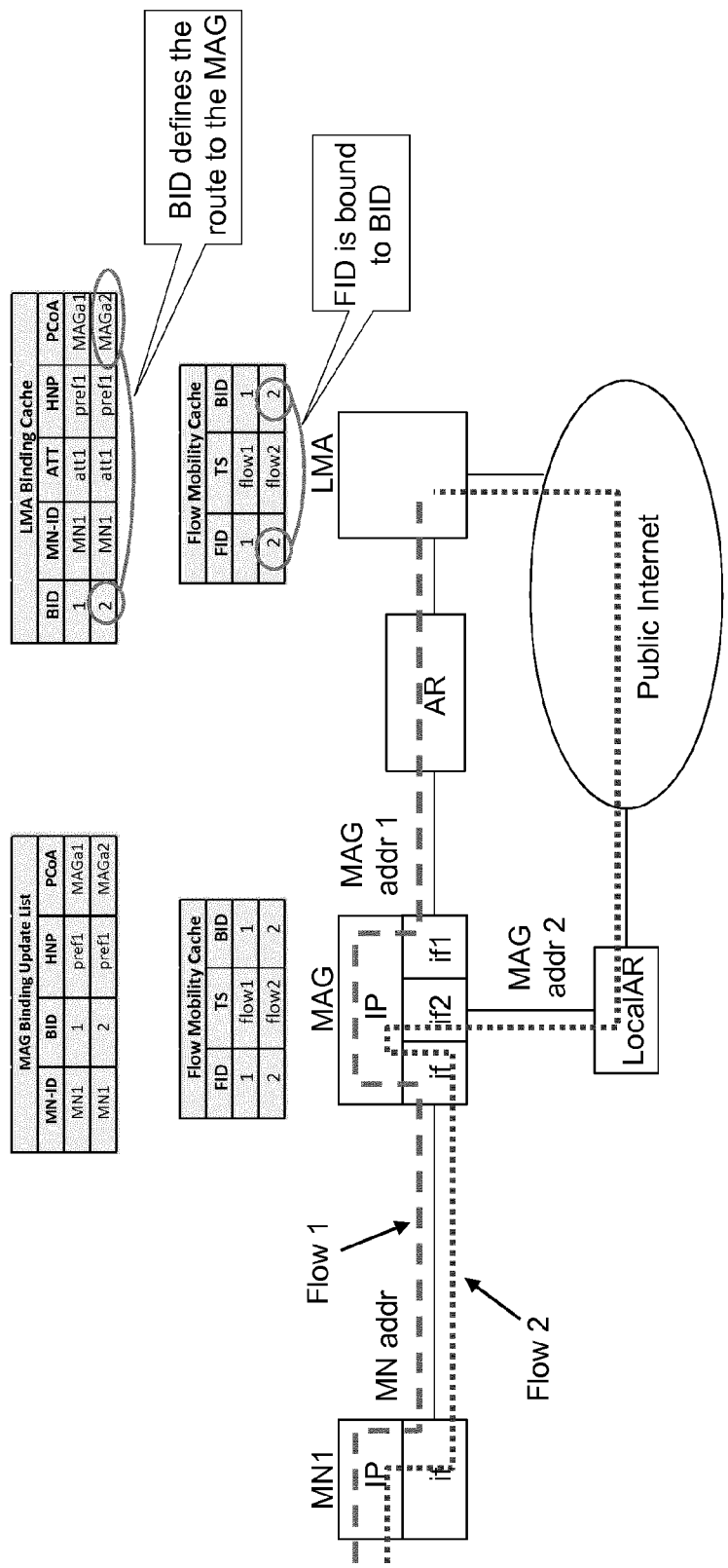
FIG. 5 shows a schematic block diagram of a system setup for traffic flow switching according to exemplary embodiments of the present invention.

FIG. 5 shows a schematic block diagram of a system setup for traffic flow switching according to exemplary embodiments of the present invention.

As shown in FIG. 5, the system setup for traffic flow switching according to exemplary embodiments of the present invention is exemplarily based on the system configuration of FIG. 1, wherein the MAG holds a MAG binding update list and a flow mobility cache, and the LMA holds a LMA binding cache and a flow mobility cache. The information in the MAG binding update list, the LMA binding cache and the flow mobility cache at the MAG and the LMA provides the basis for the flow mobility switching according to exemplary embodiments of the present invention.

In the MAG binding update list and the LMA binding cache, as described above, first and second bindings between the same set of home addresses of the host and addresses of first and second interfaces of the MAG are defined. Accordingly, each binding is associated with a route between the LMA and the MAG or, stated in other words, a binding or binding identifier BID defines a route to the MAG.

In the flow mobility cache, a mapping between any one of the first and second bindings and traffic flows between the host and the LMA via the MAG is recorded. Accordingly, each flow is associated with a binding or, stated in other words, a flow or flow identifier FID is bound/mapped to a binding or binding identifier BID that, in turn, corresponds to a certain route between the MAG and the LMA. In the exemplary setup of FIG. 5, each flow is defined by a traffic selector TS exemplified as flow1 and flow2. Therefore, the flow-based switching/mobility concept according to exemplary embodiments of the present invention enables a switching/mobility control per traffic type, e.g. to decide based on the TS of a flow what traffic is to be routed via which route or MAG interface.

In the exemplary system setup of FIG. 5, it is assumed that a first flow (illustrated by a dashed line) runs or is routed via the first interface if1 and the initial route between the MAG and the LMA, while a second flow (illustrated by a dotted line) runs or is routed via the second interface if2 and the additional/alternative route between the MAG and the LMA. That is, the flow with FID 1 and TS flow1 is bound to the binding BID1 with the PCoA MAGa1 corresponding to if1 of the MAG, while the flow with FID 2 and TS flow2 is bound to the binding BID2 with the PCoA MAGa2 corresponding to if2 of the MAG.

According to exemplary embodiments of the present invention, flow switching/mobility is based on the above-described bindings and mappings in the MAG and the LMA enabling IP host traffic flow switching/mobility between different routes between the MAG and the LMA transparently to the IP host using the same host/access connection and with minimal signaling in the network.

In the following, various exemplary approaches of the traffic flow switching/mobility according to exemplary embodiments of the present invention are described with reference to FIGS. 6 and 7.

Figure 6:
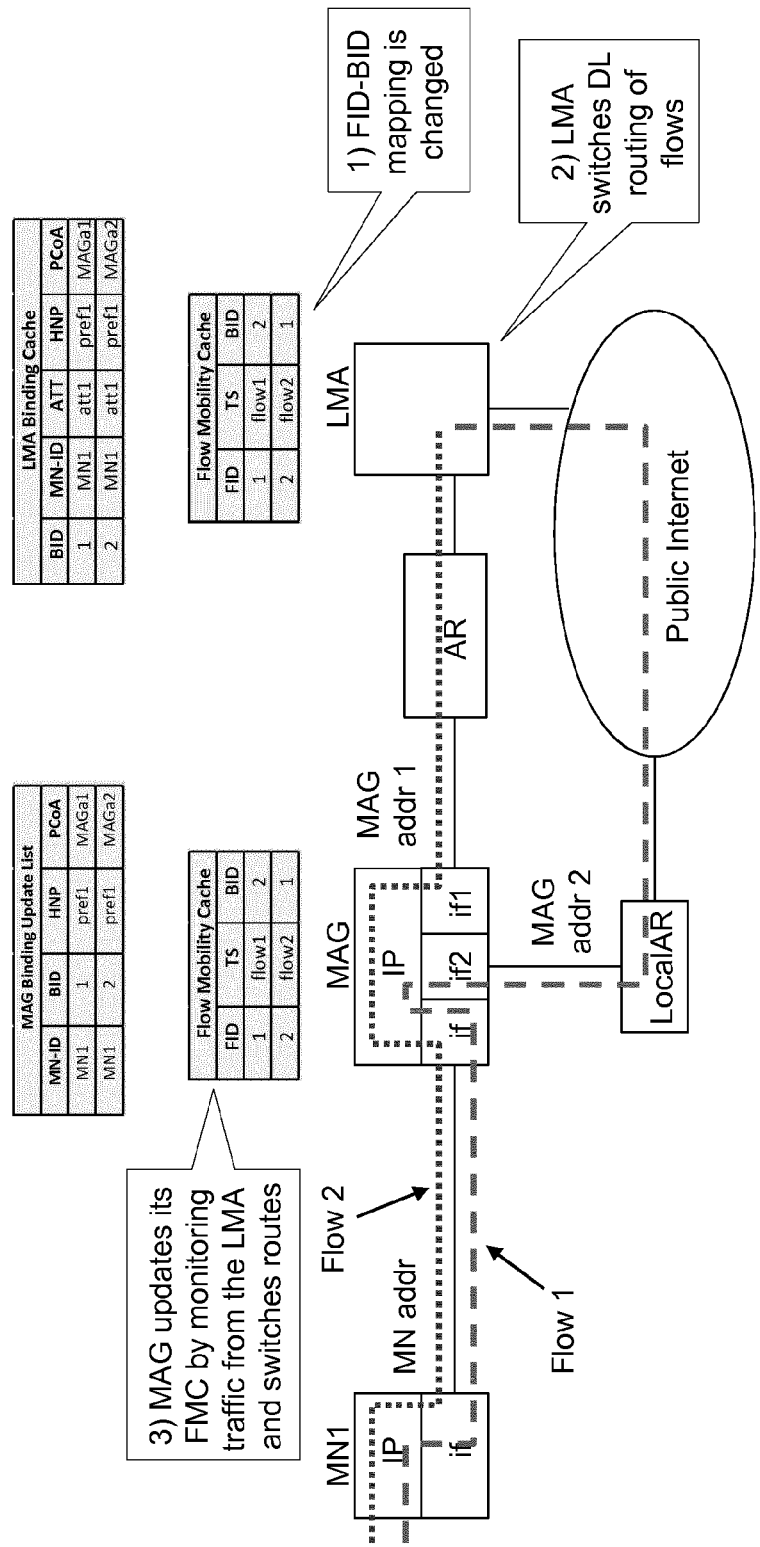
FIG. 6 shows a schematic block diagram of a system setup of LMA-initiated traffic flow switching according to exemplary embodiments of the present invention.
Figure 7:
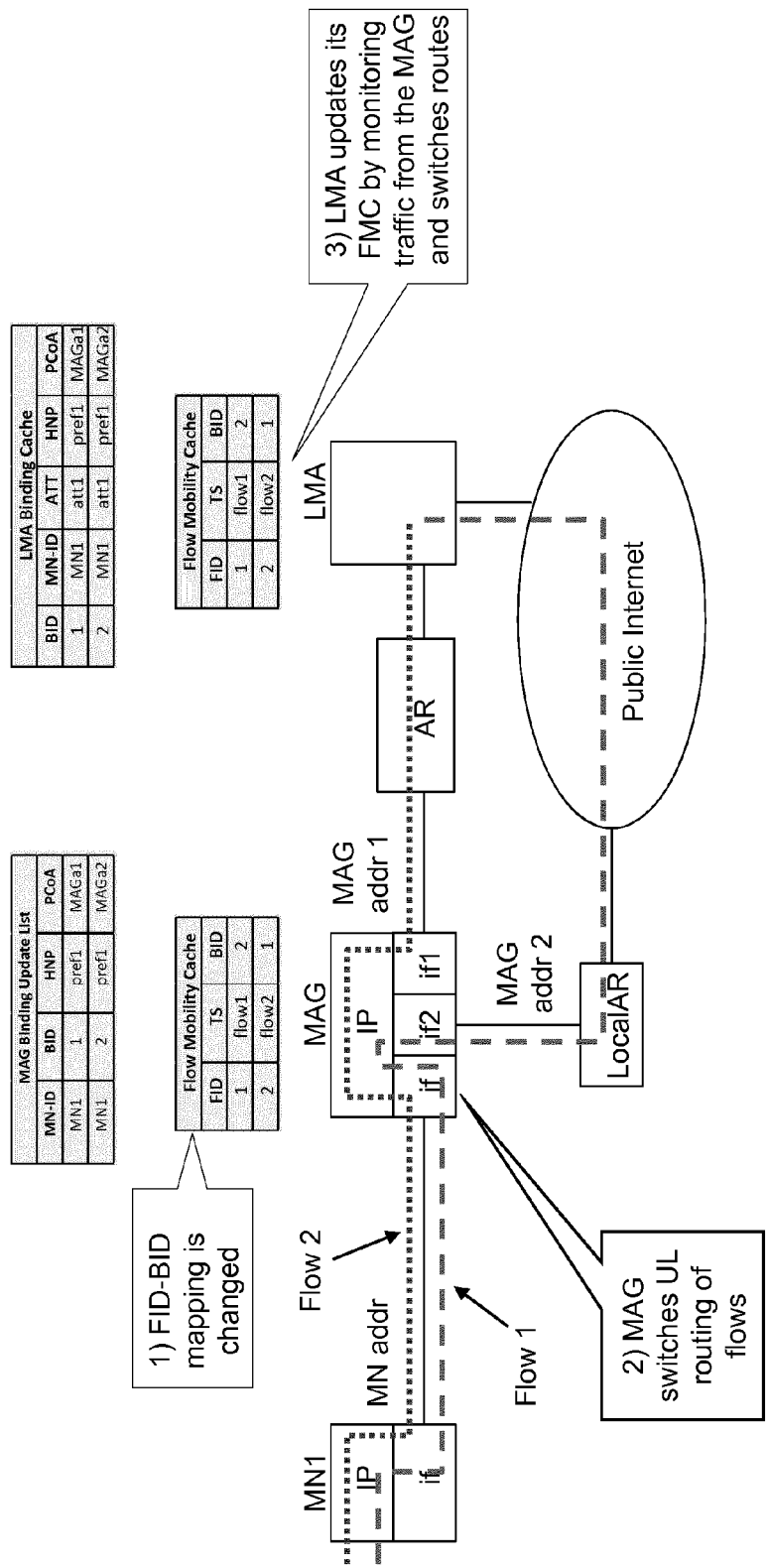
FIG. 7 shows a schematic block diagram of a system setup of MAG-initiated traffic flow switching according to exemplary embodiments of the present invention.

In the examples of FIGS. 6 and 7, it is assumed that the flows are mutually interchanged with respect to their bindings/routes. It is to be noted that such interchange is a mere example for the sake of clarity only, and exemplary embodiments of the present invention are also applicable for switching only one out of multiple flows with respect to its binding/route while maintaining the other flows with respect to their bindings/routes.

FIG. 6 shows a schematic block diagram of a system setup of LMA-initiated traffic flow switching according to exemplary embodiments of the present invention.

In the example of FIG. 6, the first and second flows, as described in connection with FIG. 5, are switched from one route to another by changing the FID-BID mapping in the flow mobility cache at the LMA. The other end of the (e.g. PMIPv6) MAG-LMA tunnel, i.e. the MAG, follows the mapping change by monitoring the incoming traffic from its interfaces, and switched the first and second flows such that the flow x is sent to the UL direction on the same interface from which the flow is received in the DL direction.

Accordingly, the LMA initiates a change of an interface to which at least one traffic flow is transmitted to the MAG, updates the recorded mapping between any one of the first and second bindings and the at least one traffic flow (in the flow mobility cache at the LMA) on the basis of the initiated change, and switches a routing of the at least one traffic flow from the LMA to the host MN1 via the changed interface out of the first and the at least one second interfaces of the MAG in accordance with the updated mapping. The MAG monitors incoming traffic in terms of an interface at which at least one traffic flow is received from the LMA, updates the recorded mapping between any one of the first and second bindings and the at least one traffic flow (in the flow mobility cache at the MAG) on the basis of the monitoring when the at least one traffic flow is received at a changed interface other than the interface of the binding according to the recorded mapping, and switches a routing of the at least one traffic flow from the host MN1 to the LMA via the changed interface out of the first and the at least one second interfaces of the MAG in accordance with the updated mapping.

FIG. 7 shows a schematic block diagram of a system setup of MAG-initiated traffic flow switching according to exemplary embodiments of the present invention.

In the example of FIG. 7, the first and second flows, as described in connection with FIG. 5, are switched from one route to another by changing the FID-BID mapping in the flow mobility cache at the MAG. The other end of the (e.g. PMIPv6) MAG-LMA tunnel, i.e. the LMA, follows the mapping change by monitoring the incoming traffic from the interfaces of the MAG, and switched the first and second flows such that the flow x is sent to the DL direction to the same interface of the MAG from which the flow is received in the UL direction.

Accordingly, the MAG initiates a change of an interface via which at least one traffic flow is transmitted to the LMA, updates the recorded mapping between any one of the first and second bindings and the at least one traffic flow (in the flow mobility cache at the MAG) on the basis of the initiated change, and switches a routing of the at least one traffic flows from the host MN1 to the LMA via the changed interface out of the first and the at least one second interfaces in accordance with the updated mapping. The LMA monitors incoming traffic in terms of an interface of the MAG, from which at least one traffic flow is received, updates the recorded mapping between any one of the first and second bindings and the at least one traffic flow (in the flow mobility cache at the LMA) on the basis of the monitoring when the at least one traffic flow is transmitted from a changed interface other than the interface of the binding according to the recorded mapping, and switches a routing of the at least one traffic flow from the LMA to the host MN1 via the changed interface out of the first and the at least one second interfaces of the MAG in accordance with the updated mapping.

It is to be noted that the LMA- and MAG-initiated traffic flow switching, as illustrated in FIGS. 6 and 7, could also be combined. Namely, the LMA-initiated traffic flow switching may be applied for a subset of traffic flows, while the MAG-initiated traffic flow switching may be applied for another subset of traffic flows, wherein the two subsets of traffic flows may e.g. be mutually exclusive. Such setting may for example be established/set by way of a flow switching/mobility negotiation, as outlined below.

With the traffic flow switching/mobility according to exemplary embodiments of the present invention, as exemplified by FIGS. 6 and 7, a symmetric routing of flows in the UL and DL directions can be achieved, while there is not needed any signaling related flow switching/mobility.

As an addition or alternative to the exemplary approaches according to FIGS. 6 and 7, the traffic flow switching/mobility according to exemplary embodiments of the present invention may also involve various deviating approaches as long as such approaches are based on the above-described bindings and mappings in the MAG and the LMA and use the same host/access connection so as to be transparent to the IP host.

As an exemplary approach, the traffic flow switching/mobility according to exemplary embodiments of the present invention may be based on a flow switching/mobility request, which could be signaled from one end of the (e.g. PMIPv6) MAG-LMA tunnel to the other end thereof, i.e. either from the MAG to the LMA or from the LMA to the MAG. That is to say, a switching of a routing of at least one traffic flow to the host via a changed interface other than the interface of the binding according to the recorded mapping may be requested by the MAG from the LMA, and/or a switching of a routing of at least one traffic flow from the host to the LMA via a changed interface other than the interface of the binding according to the recorded mapping may be requested by the LMA from the MAG. Therein, the flow or flows in question in both switching requests may be the same, partly the same or different. According to exemplary embodiments of the present invention, such flow switching request may be included e.g. in a PBU message in the additional registration process according to FIG. 4 or thereafter. For example, in compliance with some MAPIM variants, the MAG may send a traffic filter proposal in a PBU message to the LMA, and the LMA, possibly after the consultancy of the PRCF, accepts or rejects the proposed filters in a PBA message to the MAG. Thereby, an asymmetric routing of flows in the UL and DL directions can be achieved with minimal signaling.

As another exemplary approach, the traffic flow switching/mobility according to exemplary embodiments of the present invention may be based on a flow switching/mobility negotiation. That is to say, the MAG may negotiate, with the LMA, a switching of a routing of at least one traffic flow to the host via a changed interface other than the interface of the binding according to the recorded mapping, and/or the LMA may negotiate, with the MAG, a switching of a routing of at least one traffic flow from the host to the LMA via a changed interface other than the interface of the binding according to the recorded mapping. Therein, the flow or flows in question in both switching negotiations may be the same, partly the same or different. Such flow switching negotiation may for example relate to a setting of the LMA- and/or MAG-initiated traffic flow switching, as outlined above. According to exemplary embodiments of the present invention, such flow switching negotiation may be included in any signaling on the (e.g. PMIPv6) MAG-LMA tunnel, such as in PBU and PBA messages. Thereby, a symmetric or asymmetric routing of flows in the UL and DL directions can be achieved with minimal signaling.

In brief, according to exemplary embodiments of the present invention, there is provided traffic flow mobility with a single host connection. More specifically, exemplary embodiments of the present invention are capable of achieving a dynamic offloading, within one access type or technology or within one host interface or (access) connection, of part or all of traffic such as IP traffic flows from an initial transport route to an alternative route in a network-based/controlled manner. As the offload granularity is on the traffic flow (IP flow) level, the traffic offloading can be controlled per traffic type, i.e. what kind of traffic is to be switched to an alternative route. As the host needs only a single interface or (access) connection, the flow mobility in the context of traffic offloading is transparent to the host.

In view of the above, exemplary embodiments of the present invention provide a mapping, where one set of an IP host's home addresses or prefixes is associated with two or more interfaces or interface addresses such as PCoA'es. Further, exemplary embodiments of the present invention provide a flow mobility concept based on such mapping enabling host traffic flow switching between different routes between the MAG and the LMA transparently to the host using the same access and with minimal signaling in the network. As such mapping is available at the MAG representing a single access entity of the host, no switching of host interfaces and/or access types or technologies is required in the context of flow mobility.

Accordingly, exemplary embodiments of the present invention enable dynamically offloading part or all of the traffic from a base station to an alternative route through a local network to an operator (e.g. MNO) gateway. Thereby, a condition in certain architectural concepts of 4G and beyond standardization is satisfied, and exemplary embodiments of the present invention are thus applicable in/for such architectures in which a base station, in addition to the operator (e.g. MNO) transport network, is also connected to another domain like a local operator network.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 8, while for the sake of brevity reference is made to the detailed description of respective corresponding configurations/setups, schemes, methods and functionality, principles and operations according to FIGS. 1 to 7.

Figure 8:
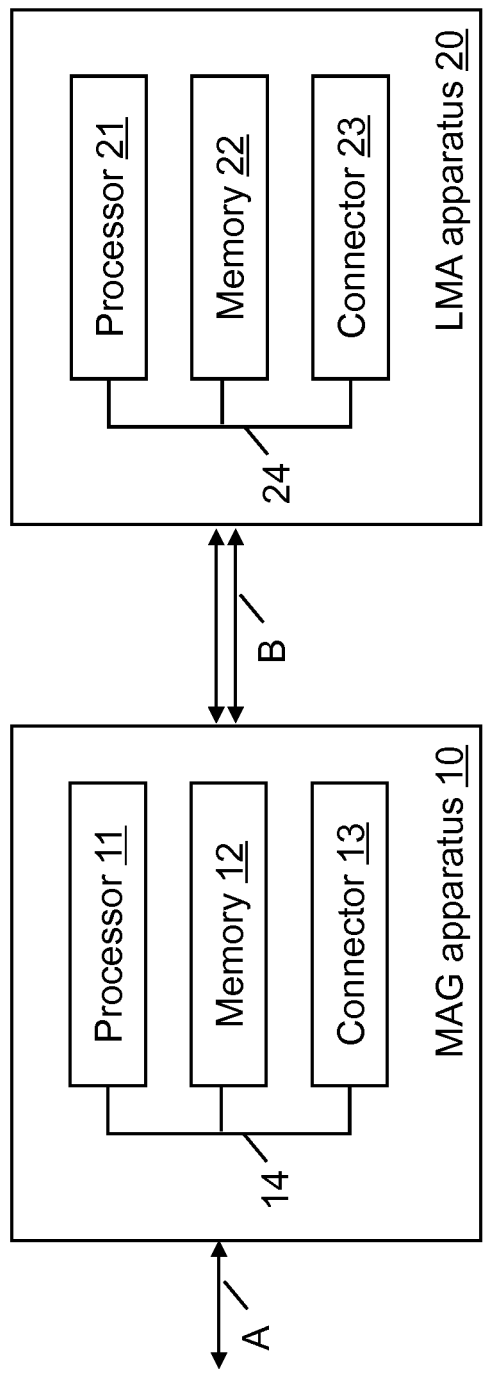
FIG. 8 shows a schematic diagram of apparatuses according to exemplary embodiments of the present invention.

In FIG. 8 below, the solid line blocks are basically configured to perform respective operations as described above. The entirety of solid line blocks are basically configured to perform the methods and operations as described above, respectively. With respect to FIG. 8, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 8, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 8 shows a schematic diagram of apparatuses according to exemplary embodiments of the present invention.

In view of the above, the thus illustrated apparatuses 10 and 20 are suitable for use in practicing the exemplary embodiments of the present invention, as described herein.

The thus illustrated apparatus 10 may represent a (part of a) mobile access gateway (function/entity) according to exemplary embodiments of the present invention, and may be configured to perform a procedure and/or exhibit a functionality as described in any one of FIGS. 1, and 3 to 7. The thus illustrated apparatus 20 may represent a (part of a) local mobility anchor (function/entity) according to exemplary embodiments of the present invention, and may be configured to perform a procedure and/or exhibit a functionality as described in any one of FIGS. 1, 2, and 4 to 7.

As indicated in FIG. 8, according to exemplary embodiments of the present invention, each of the apparatuses 10/20 comprises a processor 11/21, a memory 12/22 and a connector 13/23, which are connected by a bus 14/24 or the like. The apparatuses 10 and 20 may be connected via links B representing at least two connections or routes (i.e. one initial connection/route and at least one alternative/additional connection/route), and the apparatus 10 may be connected to a host via a link A representing a host connection such as a host interface or (access) connection.

The processor 11/21 and/or the interface 13/23 may also include a modem or the like to facilitate communication over a (hardwire or wireless) link, respectively. The connector 13/23 may include a suitable transceiver coupled to one or more antennas or communication means for (hardwire or wireless) communications with the linked or connected device(s), respectively. The connector 13/23 is generally configured to communicate with at least one other apparatus, i.e. the connector thereof. The connector 13 of the apparatus 10 may realize the first MAG interface to the host via link A as well as the one or more second MAG interfaces to the LMA via the links B, while the connector 23 of the apparatus 20 may realize the LMA interfaces (not shown) to the MAG via the links B.

The memory 12/22 may store respective programs assumed to include program instructions or computer program code that, when executed by the respective processor, enables the respective electronic device or apparatus to operate in accordance with the exemplary embodiments of the present invention. For example, the memory 12/22 may store the first and second bindings as well as the mapping e.g. in the form of the tables/caches as exemplified in FIGS. 4 to 7.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 is configured to perform establishing a first binding between a set of home addresses of a host and an address of a first interface of a mobile access gateway to a local mobility anchor, establishing at least one second binding between the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway.

Accordingly, stated in other words, the apparatus 10 at least comprises respective means for establishing the first and second bindings, and means for recording the mapping.

In its most basic form, according to exemplary embodiments of the present invention, the apparatus 20 or its processor 21 is configured to perform specifying a first binding by associating a set of home addresses of a host and an address of a first interface of a mobile access gateway to a local mobility anchor, specifying at least one second binding by associating the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway.

Accordingly, stated in other words, the apparatus 20 at least comprises respective means for specifying the first and second bindings, and means for recording the mapping.

For further details regarding the operability/functionality of the individual apparatuses, reference is made to the above description in connection with any one of FIGS. 1 to 7, respectively.

According to exemplarily embodiments of the present invention, the processor 11/21, the memory 12/22 and the connector 13/23 may be implemented as individual modules, chips, chipsets, circuitries or the like, or one or more of them can be implemented as a common module, chip, chipset, circuitry or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for traffic flow mobility with a single host connection. Such measures exemplarily comprise the definition of a first binding between a set of home addresses of a host and an address of a first interface of a mobile access gateway to a local mobility anchor, the definition of at least one second binding between the same set of home addresses of the host and an address of at least one second interface of the mobile access gateway to the local mobility anchor, and the recording of a mapping between any one of the first and second bindings and traffic flows between the host and the local mobility anchor via a host connection to the mobile access gateway.

The measures according to exemplary embodiments of the present invention may be applied for any kind of network environment, such as for example for fixed and/or mobile communication systems e.g. in accordance with any related standard of IEEE, IETF, 3GPP, 3GPP2, or the like. For example, exemplary embodiments of the present invention may be applicable in UMTS standards and/or HSPA standards and/or LTE standards (including LTE-Advanced and its evolutions) and/or WCDMA standards.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
AR Access Router
BID Binding Identifier
DL Downlink
DSMIPv6 Dual Stack Mobile IP version 6
FID Flow Identifier
GGSN Gateway GPRS Support Node
GPRS General Packet Radio Service
GW Gateway
HI Handover Indicator/Initiate
HNP Home Network Prefix
HSPA High Speed Packet Access
IEEE Institute of Electrical and Electronics Engineer
IETF Internet Engineering Task Force
if Interface
IFOM IP Flow Mobility and seamless wireless local area network offload
IP Internet Protocol
LMA Local Mobility Anchor
LTE Long Term Evolution
LTE-A LTE-Advanced
MAG Mobile Access Gateway
MAPIM Multi Access PDN connectivity and IP flow Mobility
MN Mobile Node
MNO Mobile Network Operator
P-GW PDN-GW
PBA Proxy Binding Acknowledgment
PBU Proxy Binding Update
PCoA Proxy Care of Address
PDN Packet Data Network
PMIPv6 Proxy Mobile IP version 6
PRCF Policy Charging and Rules Function
RA Router Advertisement
RtrSol Router Solicitation
SIPTO Selected IP Traffic Offload
TS Traffic Selector
UE User Equipment
UL Uplink
UMTS Universal Mobile Telecommunications System
WCDMA Wideband Code Division Multiple Access
WLAN Wireless Local Area Network

The invention claimed is:

1. A method comprising:
   establishing a first binding between a set of home addresses of a host and an address of a first interface of a mobile access gateway to a local mobility anchor, wherein the host is a user equipment,
   establishing at least one second binding between the same set of home addresses of the host and an address of at least one second interface of the mobile access gateway to the local mobility anchor, and
   recording a mapping between any one of the first and second bindings and traffic flows between the host and the local mobility anchor via a host connection to the mobile access gateway, wherein the mapping is stored in the host.

2. The method according to claim 1, wherein the establishing of the first binding comprises:
   receiving a message of an initial registration from the host via the host connection; and
   requesting a binding update for the first binding from the local mobility anchor via the first interface of the mobile access gateway to the local mobility anchor.

3. The method according to claim 1, wherein the establishing of the at least one second binding comprises:
   deciding for an additional registration at the mobile access gateway; and
   requesting a binding update for the at least one second binding from the local mobility anchor via the at least one second interface of the mobile access gateway to the local mobility anchor.

4. The method according to claim 3, wherein the method comprises at least one of:
   the deciding being based on at least one of a network-related condition or event and a predefined policy, and the binding update request for the at least one second binding comprising an indicator indicating a request for sharing the same set of home addresses of the host with the first interface.

5. The method according to claim 1, further comprising:
monitoring incoming traffic in terms of an interface at which at least one traffic flow is received from the local mobility anchor;
updating the recorded mapping between any one of the first and second bindings and the at least one traffic flow on the basis of the monitoring when the at least one traffic flow is received at a changed interface other than the interface of the binding according to the recorded mapping; and
switching a routing of the at least one traffic flow from the host to the local mobility anchor via the changed interface out of the first and the at least one second interfaces in accordance with the updated mapping.

6. The method according to claim 1, further comprising:
initiating a change of an interface via which at least one traffic flow is transmitted to the local mobility anchor;
updating the recorded mapping between any one of the first and second bindings and the at least one traffic flow on the basis of the initiated change; and
switching a routing of the at least one traffic flows from the host to the local mobility anchor via the changed interface out of the first and the at least one second interfaces in accordance with the updated mapping.

7. The method according to claim 1, further comprising at least one of:
requesting, from the local mobility anchor, a switching of a routing of at least one traffic flow to the host via a changed interface other than the interface of the binding according to the recorded mapping, and
negotiating, with the local mobility anchor, a switching of a routing of at least one traffic flow to the host via a changed interface other than the interface of the binding according to the recorded mapping.

8. The method according to claim 1, wherein the method comprises at least one of:
the method being operable at or by the mobile access gateway, and
the set of home addresses of the host comprising one or more Internet Protocol prefixes, and
the addresses of the first and second interfaces of the mobile access gateway comprising care of addresses of the mobile access gateway.

9. A method comprising:
specifying a first binding by associating a set of home addresses of a host and an address of a first interface of a mobile access gateway to a local mobility anchor, wherein the host is a user equipment,
specifying at least one second binding by associating the same set of home addresses of the host and an address of at least one second interface of the mobile access gateway to the local mobility anchor, and
recording a mapping between any one of the first and second bindings and traffic flows between the host and the local mobility anchor via a host connection to the mobile access gateway, wherein the mapping is stored in the host.

10. The method according to claim 9, wherein the first binding is specified upon request of a binding update for the first binding from the first interface of the mobile access gateway.

11. The method according to claim 9, wherein the at least one second binding is specified upon request of a binding update for the at least one second binding from the at least one second interface of mobile access gateway.

12. The method according to claim 11, wherein
the binding update request for the at least one second binding comprises an indicator indicating a request for sharing the same set of home addresses of the host with the first interface, or
the binding update request for the at least one second binding causes at least one predefined policy to determine a sharing of the same set of home addresses of the host with the first interface.

13. The method according to claim 9, further comprising
initiating a change of an interface to which at least one traffic flow is transmitted to the mobile access gateway,
updating the recorded mapping between any one of the first and second bindings and the at least one traffic flow on the basis of the initiated change, and
switching a routing of the at least one traffic flow from the local mobility anchor to the host via the changed interface out of the first and the at least one second interfaces in accordance with the updated mapping.

14. The method according to claim 9, further comprising
monitoring incoming traffic in terms of an interface of the mobile access gateway, from which at least one traffic flow is received,
updating the recorded mapping between any one of the first and second bindings and the at least one traffic flow on the basis of the monitoring when the at least one traffic flow is transmitted from a changed interface other than the interface of the binding according to the recorded mapping, and
switching a routing of the at least one traffic flow from the local mobility anchor to the host via the changed interface out of the first and the at least one second interfaces of the mobile access gateway in accordance with the updated mapping.

15. The method according to claim 9, further comprising at least one of:
requesting, from the mobile access gateway, a switching of a routing of at least one traffic flow from the host to the local mobility anchor via a changed interface other than the interface of the binding according to the recorded mapping, and
negotiating, with the mobile access gateway, a switching of a routing of at least one traffic flow from the host to the local mobility anchor via a changed interface other than the interface of the binding according to the recorded mapping.

16. The method according to claim 9, wherein the method comprises at least one of:
the method being operable at or by the local mobility anchor, and
set of home addresses of the host comprising one or more Internet Protocol prefixes, and
the addresses of the first and second interfaces of the mobile access gateway comprising care of addresses of the mobile access gateway.

17. An apparatus comprising:
a connector configured to connect to at least another apparatus,
a memory configured to store computer program code, and
a processor configured to cause the apparatus to perform:
establishing a first binding between a set of home addresses of a host and an address of a first interface of a mobile access gateway to a local mobility anchor, wherein the host is a user equipment, establishing at least one second binding between the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway, wherein the mapping is stored in the host.

18. The apparatus according to claim 17, wherein the processor is configured to cause the apparatus to perform for establishing the first binding:

receiving a message of an initial registration from the host via the host connection, and requesting a binding update for the first binding from the local mobility anchor via the first interface of the mobile access gateway to the local mobility anchor.

19. The apparatus according to claim 17, wherein the processor is configured to cause the apparatus to perform for establishing the at least one second binding:

deciding for an additional registration at the mobile access gateway, and requesting a binding update for the at least one second binding from the local mobility anchor via the at least one second interface of the mobile access gateway to the local mobility anchor.

20. The apparatus according to claim 19, wherein the processor is configured to cause the apparatus to perform at least one of:

the deciding being based on at least one of a network-related condition or event and a predefined policy, and the binding update request for the at least one second binding comprising an indicator indicating a request for sharing the same set of home addresses of the host with the first interface.

21. The apparatus according to claim 17, wherein the processor is configured to cause the apparatus to perform:

monitoring incoming traffic in terms of an interface at which at least one traffic flow is received from the local mobility anchor;

updating the recorded mapping between any one of the first and second bindings and the at least one traffic flow on the basis of the monitoring when the at least one traffic flow is received at a changed interface other than the interface of the binding according to the recorded mapping; and switching a routing of the at least one traffic flow from the host to the local mobility anchor via the changed interface out of the first and the at least one second interfaces in accordance with the updated mapping.

22. The apparatus according to claim 17, wherein the processor is configured to cause the apparatus to perform:

initiating a change of an interface via which at least one traffic flow is transmitted to the local mobility anchor;

updating the recorded mapping between any one of the first and second bindings and the at least one traffic flow on the basis of the initiated change; and switching a routing of the at least one traffic flows from the host to the local mobility anchor via the changed interface out of the first and the at least one second interfaces in accordance with the updated mapping.

23. The apparatus according to claim 17, wherein the processor is configured to cause the apparatus to perform at least one of:

requesting, from the local mobility anchor, a switching of a routing of at least one traffic flow to the host via a changed interface other than the interface of the binding according to the recorded mapping, and negotiating, with the local mobility anchor, a switching of a routing of at least one traffic flow to the host via a changed interface other than the interface of the binding according to the recorded mapping.

24. The apparatus according to claim 17, wherein the apparatus is located in one of the user equipment, a terminal, a wireless or wired access point, or a base station.

25. The apparatus according to claim 17, wherein the apparatus is operable as or at the mobile access gateway.

26. An apparatus comprising:

a connector configured to connect to at least another apparatus, a memory configured to store computer program code, and a processor configured to cause the apparatus to perform:

specifying a first binding by associating a set of home addresses of a host and an address of a first interface of a mobile access gateway to a local mobility anchor, wherein the host is a user equipment, specifying at least one second binding by associating the same set of home addresses of the host and an address of at least one second interface of the mobile access gateway to the local mobility anchor, and recording a mapping between any one of the first and second bindings and traffic flows between the host and the local mobility anchor via a host connection to the mobile access gateway, wherein the mapping is stored in the host.

27. The apparatus according to claim 26, wherein the processor is configured to cause the apparatus to perform such that the first binding is specified upon request of a binding update for the first binding from the first interface of the mobile access gateway.

28. The apparatus according to claim 26, wherein the processor is configured to cause the apparatus to perform such that the at least one second binding is specified upon request of a binding update for the at least one second binding from the at least one second interface of mobile access gateway.

29. The apparatus according to claim 28, the processor is configured to cause the apparatus to perform such that the binding update request for the at least one second binding comprises an indicator indicating a request for sharing the same set of home addresses of the host with the first interface, or the binding update request for the at least one second binding causes at least one predefined policy to determine a sharing of the same set of home addresses of the host with the first interface.

30. The apparatus according to claim 26, the processor is configured to cause the apparatus to perform:

initiating a change of an interface to which at least one traffic flow is transmitted to the mobile access gateway;

updating the recorded mapping between any one of the first and second bindings and the at least one traffic flow on the basis of the initiated change; and switching a routing of the at least one traffic flow from the local mobility anchor to the host via the changed interface out of the first and the at least one second interfaces in accordance with the updated mapping.

31. The apparatus according to claim 26, the processor is configured to cause the apparatus to perform:

monitoring incoming traffic in terms of an interface of the mobile access gateway, from which at least one traffic flow is received;

updating the recorded mapping between any one of the first and second bindings and the at least one traffic flow on the basis of the monitoring when the at least one traffic flow is transmitted from a changed interface other than the interface of the binding according to the recorded mapping; and switching a routing of the at least one traffic flow from the local mobility anchor to the host via the changed interface out of the first and the at least one second interfaces of the mobile access gateway in accordance with the updated mapping.

32. The apparatus according to claim 26, the processor is configured to cause the apparatus to perform at least one of:

requesting, from the mobile access gateway, a switching of a routing of at least one traffic flow from the host to the local mobility anchor via a changed interface other than the interface of the binding according to the recorded mapping, and negotiating, with the mobile access gateway, a switching of a routing of at least one traffic flow from the host to the local mobility anchor via a changed interface other than the interface of the binding according to the recorded mapping.

33. The apparatus according to claim 26, wherein the apparatus is located in a mobile network operator gateway.

34. The apparatus according to claim 26, wherein the apparatus is operable at or by the local mobility anchor.

35. A computer program product embodied in a non-transitory computer-readable medium and encoding instructions that, when executed in hardware, perform a process according to the method of claim 1.

* * * * *